US012631250B2

(12) United States Patent
Seubert et al.

(10) Patent No.: US 12,631,250 B2
(45) Date of Patent: May 19, 2026

(54) PLANETARY GEARBOX WITH A THRUST WASHER HAVING ANTI-ROTATION MEANS

(71) Applicant: Schaeffler Technologies AG & Co. KG, Herzogenaurach (DE)

(72) Inventors: Manuel Seubert, Eckental (DE); Ralph Schimpf, Nuremberg (DE); Martin Antálek, Kátov (SK)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/710,328

(22) PCT Filed: Nov. 21, 2022

(86) PCT No.: PCT/DE2022/100868
§ 371 (c)(1),
(2) Date: May 15, 2024

(87) PCT Pub. No.: WO2023/093939
PCT Pub. Date: Jun. 1, 2023

(65) Prior Publication Data
US 2025/0003483 A1 Jan. 2, 2025

(30) Foreign Application Priority Data
Nov. 26, 2021 (DE) ..................... 10 2021 131 137.3

(51) Int. Cl.
*F16H 57/04* (2010.01)
*F16C 33/10* (2006.01)
*F16H 57/08* (2006.01)

(52) U.S. Cl.
CPC ..... *F16H 57/0482* (2013.01); *F16C 33/1065* (2013.01); *F16H 57/0479* (2013.01); *F16H 57/082* (2013.01)

(58) Field of Classification Search
CPC ... F16H 57/0482; F16H 57/03; F16H 57/0479
See application file for complete search history.

(56) References Cited

U.S. PATENT DOCUMENTS 5,695,424 A * 12/1997 Mizuta ................... F16C 17/04
184/6.12
7,252,615 B2 8/2007 Kempf
(Continued)

FOREIGN PATENT DOCUMENTS

DE 4009968 A1 11/1990
DE 10216137 A1 10/2003
(Continued)

*Primary Examiner* — Tinh T Dang

(57) ABSTRACT

A planetary gearbox includes a housing having a pair of stops, a planet bearing mounted in the housing, and a planet gear rotatable on the planet bearing. The planet bearing is formed from an axially aligned planet pin and a thrust washer. The thrust washer includes two integrally-formed projections, each facing one of the stops to prevent rotation of the thrust washer about the planetary axis. The thrust washer also includes first thrust surfaces disposed on a first side of the thrust washer facing the housing, first lubrication channels formed axially opposite the first thrust surfaces and extending radially outwards, second thrust surfaces circumferentially offset from the first thrust surfaces and disposed on a second side of the thrust washer facing the planet gear, and second lubrication channels formed axially opposite the second thrust surfaces and extending radially outwards.

17 Claims, 8 Drawing Sheets

(56)  References Cited

U.S. PATENT DOCUMENTS

| | | | | |
|---|---|---|---|---|
| 8,992,369 B2 * | 3/2015 | Miller | .................. | F16H 57/082 |
| | | | | 475/160 |
| 2014/0194244 A1 * | 7/2014 | Miller | ..................... | F16C 35/02 |
| | | | | 475/331 |
| 2016/0032970 A1 | 2/2016 | Dehne et al. | | |
| 2018/0283532 A1 | 10/2018 | Ishino | | |

FOREIGN PATENT DOCUMENTS

| | | | | | |
|---|---|---|---|---|---|
| DE | 10343842 | A1 | 5/2005 | | |
| DE | 102004014578 | A1 * | 12/2005 | .......... | F16H 57/082 |
| DE | 102005004488 | A1 | 8/2006 | | |
| DE | 102007041184 | A1 | 3/2009 | | |
| DE | 102013200240 | A1 | 7/2014 | | |
| EP | 1580459 | A2 | 9/2005 | | |
| EP | 1590459 | A2 | 9/2005 | | |
| JP | 2001082456 | A | 3/2001 | | |
| KR | 200319853 | Y1 | 10/2003 | | |
| KR | 20170058478 | A * | 5/2017 | ............ | F16H 57/04 |

* cited by examiner

PLANETARY GEARBOX WITH A THRUST WASHER HAVING ANTI-ROTATION MEANS

CROSS-REFERENCE TO RELATED APPLICATIONS

This application is the United States National Phase of PCT Appln. No. PCT/DE2022/100868 filed Nov. 21, 2022, which claims priority to German Application No. DE102021131137.3 filed Nov. 26, 2021, the entire disclosures of which are incorporated by reference herein.

TECHNICAL FIELD

The present disclosure relates to a planetary gearbox having a housing, with planet gears and with planet bearings. The planet gears are mounted on the housing by means of the planet bearings so as to be rotatable about an axially aligned planetary axis and at least one of the planet bearings is formed from at least one axially aligned planet pin and a thrust washer. The thrust washer is seated axially between the planet gear and the housing on the planet pin and is held in a form-fitting manner with the aid of an anti-rotation means so as to prevent rotation about the planetary axis and relative to the housing.

BACKGROUND

Such a planetary gearbox is disclosed in DE 40 09 968 A1. The thrust washers are axial sliding bearings of the planet bearings for the respective planet gear. The planet gear is mounted radially on a planet bolt by means of the planet bearing. The thrust washers are seated axially between the planet bearing, the planet gear and the planet carrier. A bearing surface is defined via the surface of the respective thrust washer, which is usually designed as a sliding bearing surface. The sliding bearing surfaces are designed differently from case to case. The thrust washers are equipped with tongue-like anti-rotation means. This prevents the respective thrust washer from rotating in relation to the planet carrier and avoids frictional wear in the contact zone between the hard thrust washer and the usually non-hardened planet carrier. On the other hand, undefined friction or sliding conditions between the thrust washer and the planet gear are avoided.

SUMMARY

The present disclosure provides a planetary gearbox which can be produced easily and inexpensively.

According to the disclosure, the thrust washer has first thrust surfaces on a first side facing the housing and second thrust surfaces offset circumferentially relative to the first thrust surfaces on a second side facing a planet gear. Furthermore, a trough-like lubrication channel is formed on the thrust washer axially on the rear side of the thrust surfaces in each case. The lubrication channel extends radially outwards from the direction of the planet pin as far as an edge which delimits the thrust washer radially on the outside.

In one embodiment, the lubrication channel extends in each case between two of the first thrust surfaces of the thrust washer which are circumferentially adjacent to one another.

In a further embodiment, the lubrication channel ends at at least one of the anti-rotation means of a thrust washer.

In one embodiment, a design of the planetary gearbox is assumed in which at least one housing section of the housing is formed as a planet carrier and the housing sections are support cheeks of the planet carrier connected axially by means of connecting pieces. In such a planetary gearbox, the stop is a connecting piece projecting axially from one support cheek of the planet carrier in the direction of a further support cheek.

In a further development of the aforementioned embodiment, each of the connecting pieces has at least one stop for one anti-rotation means formed on one and the same thrust washer of two anti-rotation means formed on the thrust washer.

In addition, in a further development, two flanks of the planet carrier facing away from one another are the stops for the anti-rotation means of a thrust washer. The stops are formed circumferentially between two adjacent connecting pieces and adjoining the planet pin.

In a further embodiment, the thrust washer has two anti-rotation means which extend radially from a washer body and are formed circumferentially about a planetary axis of a planet gear adjacent to one another on the washer body and are made of a material of the thrust washer. The anti-rotation means may be integrally formed with a washer body of the thrust washer. The material may be sheet steel. A first anti-rotation means rests against a first stop. A second anti-rotation means formed on the same thrust washer rests against a second stop opposite the first stop. The respective stop may be formed on a connecting piece of a planet carrier of the planetary gearbox. Two support cheeks of the planet carrier are connected to one another via the respective connecting piece.

In a further embodiment, at least one of the anti-rotation means projects radially away from the planet pin beyond a contour of the planet gear, which contour delimits the planet gear on the outside.

In one embodiment, at least one of the anti-rotation means projects radially away from the planet pin beyond a contour of the planet gear, which contour delimits the at least one planet gear on the outside. In this regard, the lubrication channel, which is delimited on at least one side by the thrust washer, extends radially outwards relative to the planetary axis to as far as an outer contour of the anti-rotation means, which delimits the thrust washer radially on the outside.

The disclosure also provides for a thrust washer for the planetary gearbox. The thrust washer has first bulges and second bulges circumferentially adjacent to the first bulges. The first thrust surfaces are separated from one another by first bulges of the thrust washer. The second thrust surfaces are formed on the first bulges on the second side and rear side and are separated from one another by second bulges of the thrust washer. The first thrust surfaces are formed on the second bulges on the first side and rear side. A first bulge and a second bulge are, in each case, connected to one another by an elbowed section, which ensures the axial offset of the thrust surfaces. The bulges extend radially outwards in a trough-like manner from the direction of the planet pins as far as an edge of the thrust washer which delimits the thrust washer radially on the outside. The bulges may continue radially beyond an outer circumference of the washer body of the thrust washer and further at least partially into the anti-rotation means or, for example, up to the outer contour of the thrust washer on the anti-rotation means.

Two anti-rotation means are formed on the thrust washer instead of just one. This results in more possibilities for securing the thrust washer so as to prevent rotation. A targeted mounting of the thrust washer can be dispensed with in most cases. The thrust washer is supported against rotation by means of the respective anti-rotation means, either on one or two stops. Due to the aforementioned design of the axial washer, it is identical on both axially directed end faces and also mirror-symmetrical with respect to the anti-rotation means so that it can be mounted in the planet carrier without the need for a directionally oriented mounting.

It is also provided that the stop is a connecting piece that connects the housing sections, e.g., the support cheeks of a planet carrier, with one another, which alternatively also forms more than one stop. As these connecting pieces are already present in any case, the complex production of additional form-fit recesses for the engagement of the anti-rotation means of the thrust washers can advantageously be dispensed with.

Housings are housings of vehicle transmissions, of electric motors or of drive units operated by electric motors—but are alternatively also planet carriers and differential cases, e.g., differential cases of spur gear differentials. Accordingly, housing sections are, for example, end shields, partition walls, solid housings, halves of differential cases or support cheeks of planet carriers.

In one embodiment, the stop protrudes at least partially axially into a gap between planet gears distributed circumferentially around the central axis and adjacent to one another. This means that no additional effort is required for the positional orientation of the anti-rotation means. The connecting pieces, which are already circumferentially adjacent to one another, can be used as stops.

The thrust washer according to the disclosure is designed such that the stop radially adjoins the planet pin and projects radially beyond a contour of the housing. The position of the stop is therefore not essentially linked to the circumference of the planet gear, as is the case with known planet bearings, but is independent of it. Accordingly, there are a variety of design options for the anti-rotation means and the stop. For example, in one embodiment, the stop can have two stop sides pointing away from one another and in opposite circumferential directions, each serving to abut, in each case, a different anti-rotation means of one and the same thrust washer.

The bulges on the thrust washers interact with a further component to create lubrication channels, which can optionally form channels delimited by further thrust washers, housing sections, sections of the planet carrier or flanks of planet gears. Through these channels, lubricating oil reaching the thrust washer can be conveyed from the thrust washers on the inside radially to the outside without any additional effort.

In planetary gearboxes of the prior art, the thrust washers are provided with anti-rotation means for the reasons already mentioned in the "BACKGROUND" section. As such, the anti-rotation means engages in a form-fitting manner in a form-fit recess prepared on the respective housing, for example in a hole, an indentation or a recess. Accordingly, the thrust washers must be aligned, held and positioned with respect to the form-fit recesses when mounting the planet bearings with the anti-rotation means. This is often associated with increased effort—on the one hand, because the respective form-fit recess must be introduced into the housing and, on the other hand, because the directional positioning requires specific devices and operations for assembly.

When assembling planetary gearboxes, the aim is to handle planet gears together with the planet bearing (needle or roller bearing), with the planet pin/planet bolt and with the thrust washer as an assembly. This is possible by implementing the disclosed device with the planetary gearboxes according to the disclosure.

BRIEF DESCRIPTION OF THE DRAWINGS

The present disclosure is described in more detail below with reference to the drawings.

The term "axial" is understood as aligned with the central axis 9 of the planetary gearbox 1 or 21. The term "radial" is understood as transverse to the axial direction.

DETAILED DESCRIPTION

Figure 1:
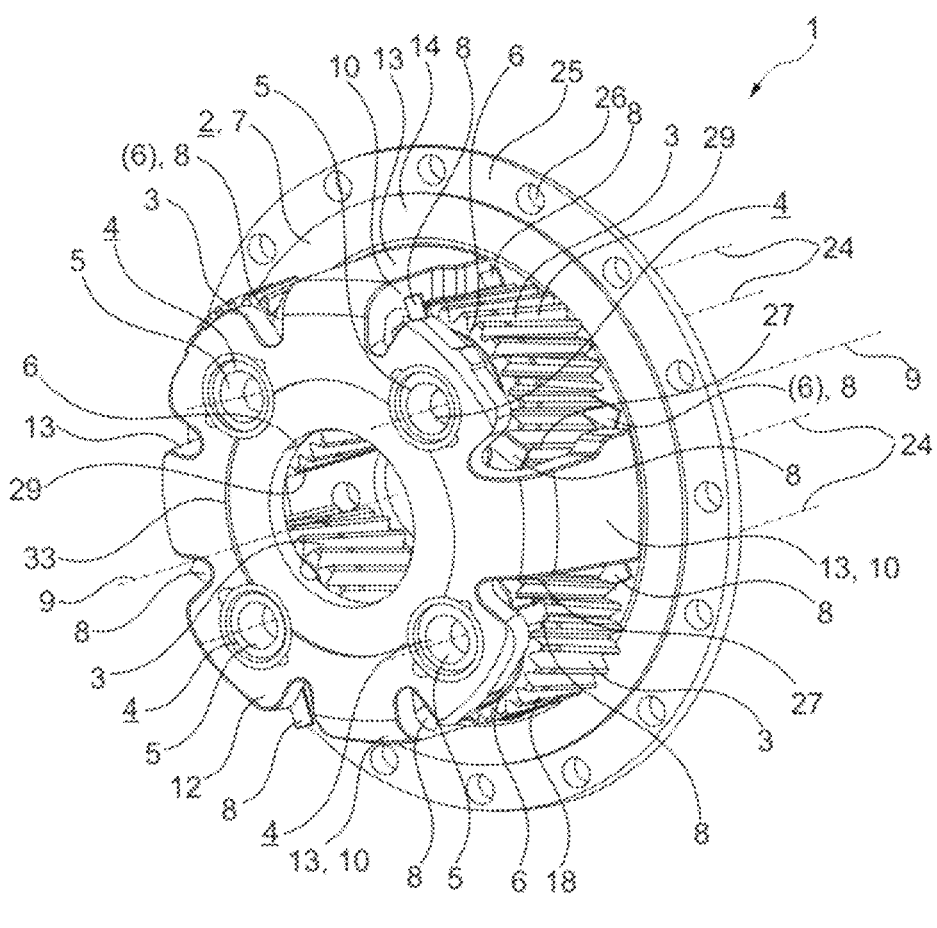
FIG. 1 shows a general view of an exemplary embodiment of a planetary gearbox 1 with a lateral view of one side of the planetary gearbox 1.

FIG. 1 shows a planetary gearbox 1 with a housing 2, planet gears 3 and planet bearings 4. The housing 2 is a planet carrier 7, which is formed from a case-like support cheek 12 and a support cheek 14 with a flange 25. A plate-like base body 33 of the support cheek 12 is provided with axially aligned connecting pieces 13. The support cheek 12 is connected to the support cheek 14 via the connecting pieces 13. The flange 25 has through-holes 26 for fastening the planetary gearbox 1.

Pocket-like windows 27 are formed between the connecting pieces 13. The toothing 29 of a planet gear 3 protrudes from each of the windows 27. The planet gears 3 are arranged in the support cheek 12 axially between the support cheek 12 and the support cheek 14 and at equal distances from one another around the central axis 9, each distributed with a radial distance between its planetary axis 24 and the central axis 9. On the respective planet bearing 4, the planet gears 3 are mounted with planet pins 5 on one side in the support cheek 12 and on the other side in the support cheek 14. In each case, one thrust washer 6 is arranged between the respective planet gear 3 and the support cheek 12 or 14, which is largely concealed in the illustration, the anti-rotation means 8 of which project radially beyond the contour 18 of the toothing 29 and are opposite a stop 10. Each of the connecting pieces 13 is a stop 10 or forms a stop 10 for, in each case, four of the anti-rotation means 8 and thus for four thrust washers 6. Of the four thrust washers 6, two of the thrust washers 6 are, in each case, assigned to one window 27 and two of the thrust washers 6 are assigned to an adjacent window 27.

Figure 2:
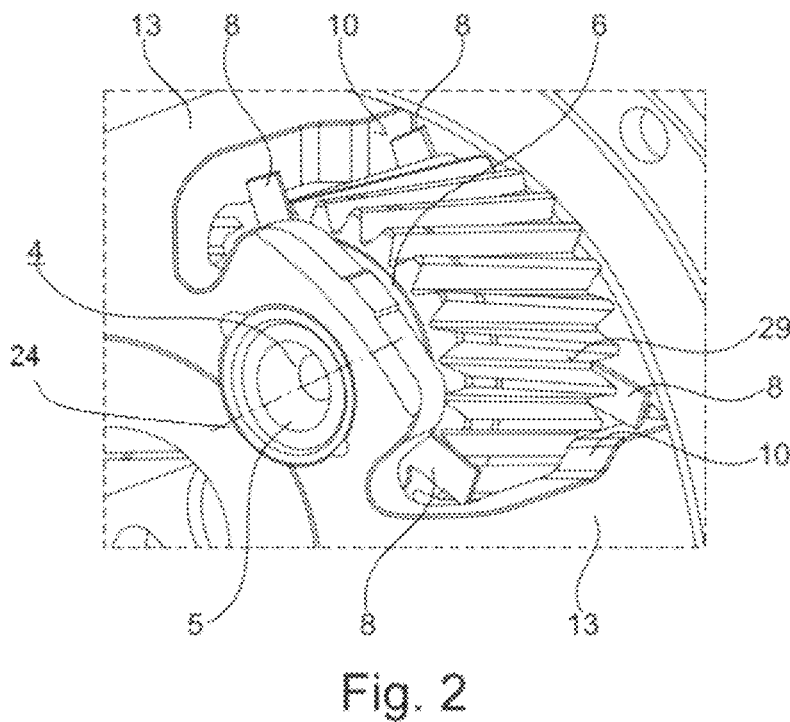
FIG. 2 shows a detail from FIG. 1 with a planet bearing 4, enlarged and not shown to scale.

FIGS. 1 and 2—Of the planet bearings 4, in each case only the end faces of the planet pins 5 and anti-rotation means 8 of the thrust washers 6, which are almost concealed in the view, are visible. In the example shown, it is assumed that the planet pins 5 are designed as planet bolts on which the planet gears 3 are mounted such that they can rotate about the planetary axes 24. Alternatively, the planet pins 5 can also be formed integrally/in one piece with the planet gears 3. The thrust washers 6 are provided with tongue-like projections which project radially beyond the toothing 29 of the respective planet gear 3 and which form an anti-rotation means 8 at the stops 10. As already mentioned above, the connecting pieces 13 are the stops 10.

Figure 6:
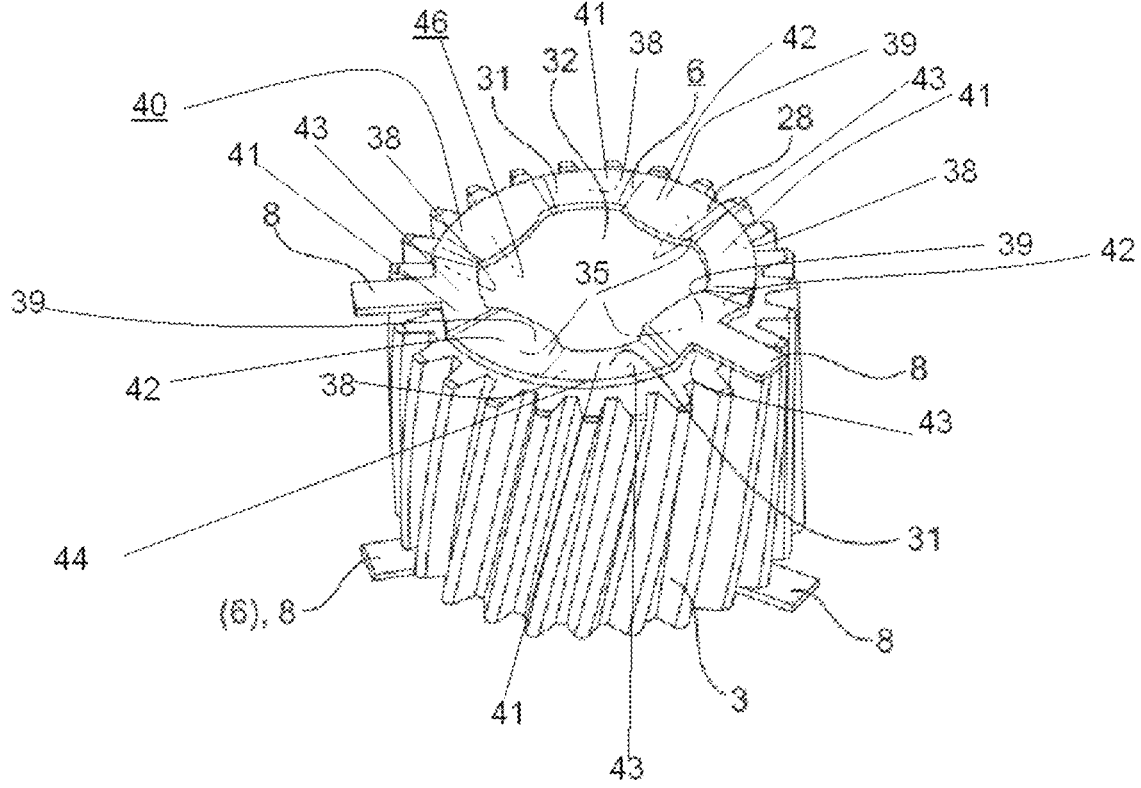
FIG. 6 schematically shows an assembly of the planetary gearbox 1.

FIG. 6—The thrust washers 6 are made of sheet metal. In this illustration, a thrust washer 6 is shown as an individual component positioned on a planet gear 3. The other thrust washer 6 is concealed by the gear 3. Of the concealed thrust washer 6, only the anti-rotation means 8 are visible. The thrust washer 6 has a washer body 28 which surrounds a through-hole 32. Axial recesses 31 are formed on the washer body 28. Two tongue-like anti-rotation means 8 project radially from the washer body 28. The first side 40 of the thrust washer 6 facing away from the planet gear 3 and facing towards the housing 3 or the planet carrier 7 during installation has first thrust surfaces 39. The thrust surfaces 39 are formed on the front side of the axial bulges 42. These bulges 42 form trough-like lubrication channels 43 on the rear side of the thrust surfaces 39 and limit an oil passage with the planet gear 3, which extends through the lubrication channel 43 on the inside from the through-hole 32 radially outwards to the edge 44.

The second side 46 of the thrust washer 6, which faces the planet gear 3 and is concealed in the illustration, is provided with second thrust surfaces 38, which are concealed in the illustration and which are formed on the front side of the bulges 41. The front side lies in the direction in which the bulge 41 is axially curved and closes it off axially. In the view shown, the bulges 41 form lubrication channels 43 open to the top and, in the installed state (see FIG. 1), together with the planet carrier 7, limit the oil passage, which extends radially outwards on the inside from the through-hole 32 to the edge 44 of the thrust washer 6. In this regard, some of the lubrication channels 43 end radially on the anti-rotation means 8 as seen in the radial direction, which in both cases continues in the radial direction from the radial end of the bulge 41 or 42 in the radial direction projecting beyond the washer body 28.

Figure 3:
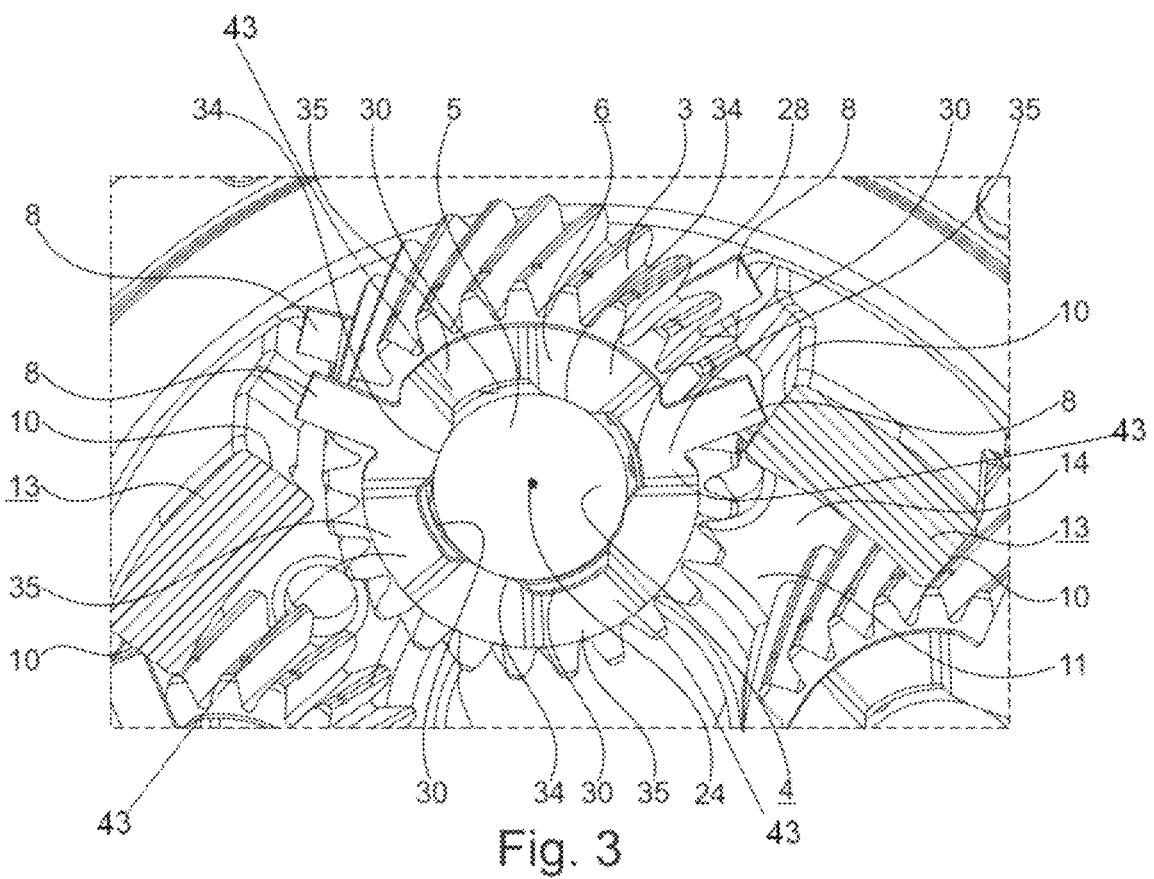
FIG. 3 shows a detail of the arrangement shown in FIG. 1 in an exposed view, in which the base body 33 of a support cheek 12 in the foreground in FIG. 1 is omitted.

FIG. 3—A view is shown from the axial direction of the thrust washer 6 of a planet bearing 4 in an imaginary and not shown radial plane, wherein the radial plane extends axially between the base body 33 of the support cheek 12 cut out of this view and the thrust washer 6. The thrust washer 6 is guided on the planet pin 5 via edge sections 34 of the through-hole 32 or the washer body 28. The edge sections 34 delimit the indentations 30 on the edge in the circumferential direction around the planetary axis 24. The indentations 30 connect radially on the inside to lubrication grooves 35 in the thrust washer 6. The respective planet pin 5 is a planet bolt and is mounted in the support cheek 14 visible in the background of the illustration and in the foreground (not shown) in the support plate 12. The respective planetary axis 24 extends axially and, in the representation according to FIG. 3, vertically into the image plane. A planet gear 3 follows the respective thrust washer 6 in the viewing direction. Anti-rotation means 8 of a thrust washer 6, which is concealed by the planet gear 3 and arranged axially between the planet gear 3 and the support cheek 14, are visible in the background of the illustration.

The two thrust washers 6 are provided with the anti-rotation means 8, which protrude radially as tongues from the sheet metal of the thrust washer 6. In this context, the tongues form an angle of 120° between them in a circumferential direction, which can alternatively also be greater or less than 120°.

A gap 11 is formed between two opposing planet gears 3. One of the connecting pieces 13, which forms one or more of the stops 10, extends between the support cheeks 12 and 14 in every gap 11. In this case, the stop 10 is formed on a flank of the connecting piece 13 facing the planet gear 3. It is also conceivable that two of the connecting pieces extend in a gap. A pivoting clearance is formed between the anti-rotation means 8 and the connecting pieces 13, by which the thrust washer 6 can pivot on the planet bolt about the planetary axis 24 up to the respective stop 10 so that one of the anti-rotation means 8 of the respective thrust washer can abut against the stop 10 opposite to it or none of the anti-rotation means 10 can come into contact. Lubrication channels 43 formed in the thrust washer 6 are visible here.

Figure 4:
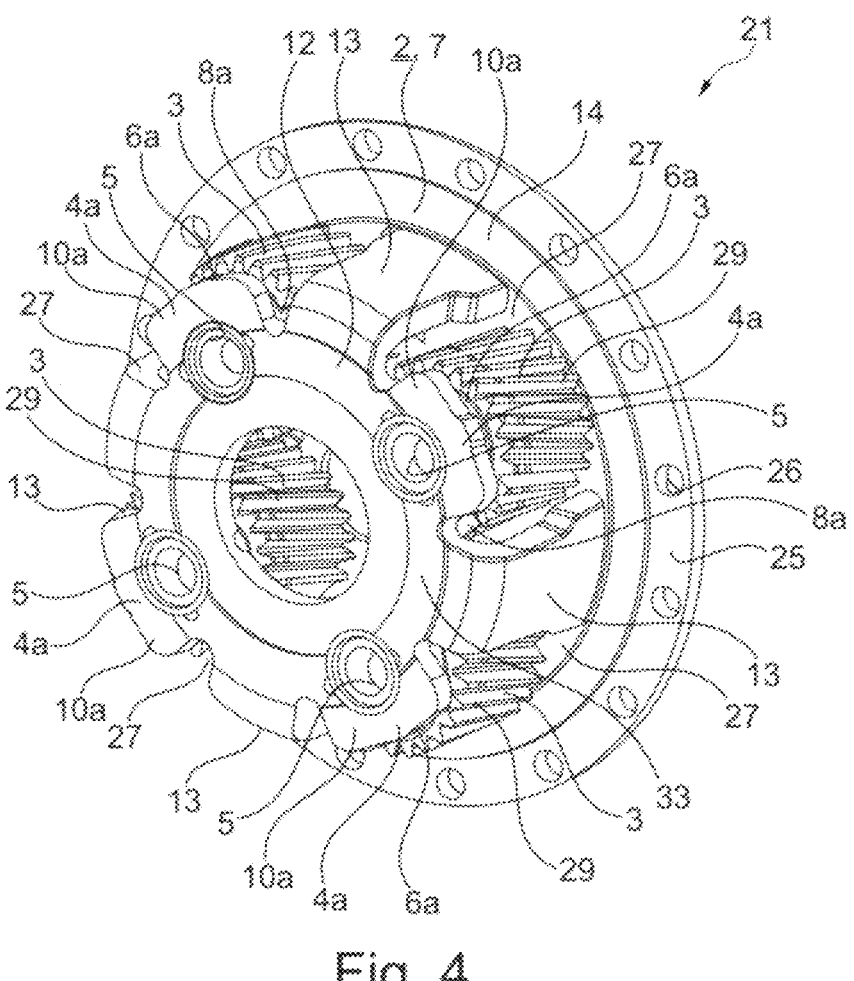
FIG. 4 shows a general view of an exemplary embodiment of a planetary gearbox 21 with a lateral view of one side of the planetary gearbox 21.

FIG. 4—A planetary gearbox 21 with a housing 2, planet gears 3 and planet bearings 4a is shown. The housing 2 is a planet carrier 7, which is formed from a case-like support cheek 12 and a support cheek 14 with a flange 25. A plate-like base body 33 of the support cheek 12 is provided with axially aligned connecting pieces 13. The support cheek 12 is connected to the support cheek 14 via the connecting pieces 13. The flange 25 has through-holes 26 for fastening the planetary gearbox 21.

Pocket-like windows 27 are formed between the connecting pieces 13. The toothing 29 of a planet gear 3 protrudes from each of the windows 27. The planet gears 3 are arranged axially between the support cheek 12 and the support cheek 14 and are distributed at equal distances from one another in the case of the support cheek 12. The planet gears 3 are mounted with planet pins 5 on one side in the support cheek 12 and on the other side in the support cheek 14. The planet gears 3 are rotatably mounted on the housing 2 by means of the planet bearings 4a. The respective planet bearing 4a is formed from the axially aligned planet pin/ planet bolt 5 and a thrust washer 6a. The thrust washer 6a sits axially between the planet gear 3 and the housing 2 on the planet pin 5, is provided with two anti-rotation means 8a, and is held by these anti-rotation means 8a against rotation relative to the housing 2 in a form-fitting manner against a stop 10a.

The stop 10a is formed circumferentially between two adjacent connecting pieces 13 and projects radially beyond a contour of the base body 33 of the support cheek 12, adjoining the planet pin 5 radially on the outside, when viewed in the radial direction from the center of the planetary gearbox 21. More precisely, the stops 10a for, in each case, one of the thrust washers 6a are circumferentially formed on the flanks of the planet carrier 7 facing away from one another between two adjacent connecting pieces 13 and adjoining the respective planet pin 5. The flanks are body edges or surfaces, directed in the circumferential direction, of a radially projecting support section of the support cheek 12, at which the planet pins 5 are partly accommodated in the support cheek 12.

Figure 5:
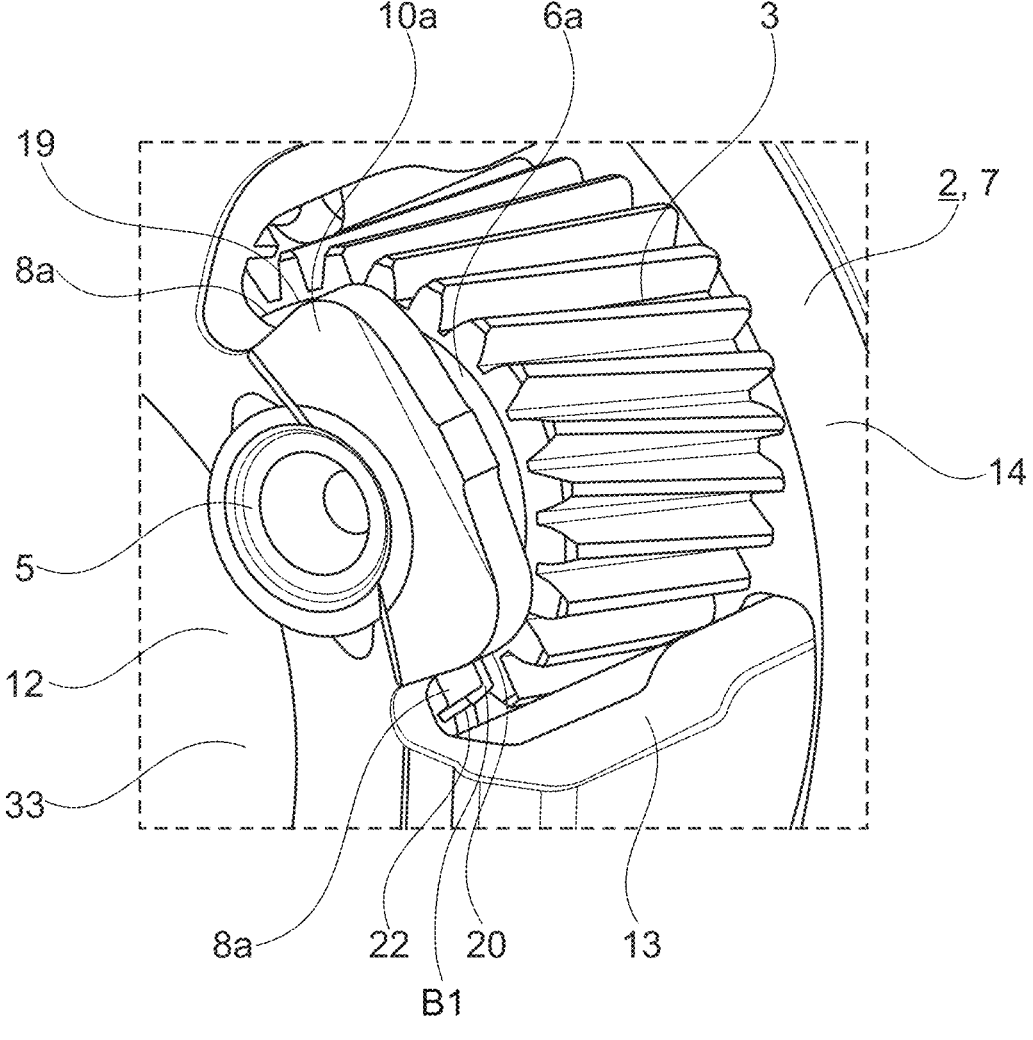
FIG. 5 shows a detail from FIG. 4 with a position of a planet gear 3, enlarged and not shown to scale.

FIG. 5—The illustration shows sections of the housing 2 formed as a planet carrier 7, the support cheek 14 and the support cheek 12. The respective stop 10a projecting radially from the base body 33 has stop surfaces 19 and 20. A partial surface of the respective stop surface 19 or 20 is opposite the flank of a connecting piece 13. A first anti-rotation means 8a formed on the respective thrust washer 6a in the form of a tongue curved in the manner of a wing having a bend B1 the end engages behind the stop 10a on a first stop side 19. A further tongue of a further anti-rotation means 8a also curved in the manner of a wing at the end engages behind a second stop side 20 of the stop 10a in the opposite circumferential direction, which stop side faces away from the first stop side 19 in the circumferential direction. The wings 22 of the anti-rotation means 8a are angled slightly in an axial direction for this purpose.

Figure 7:
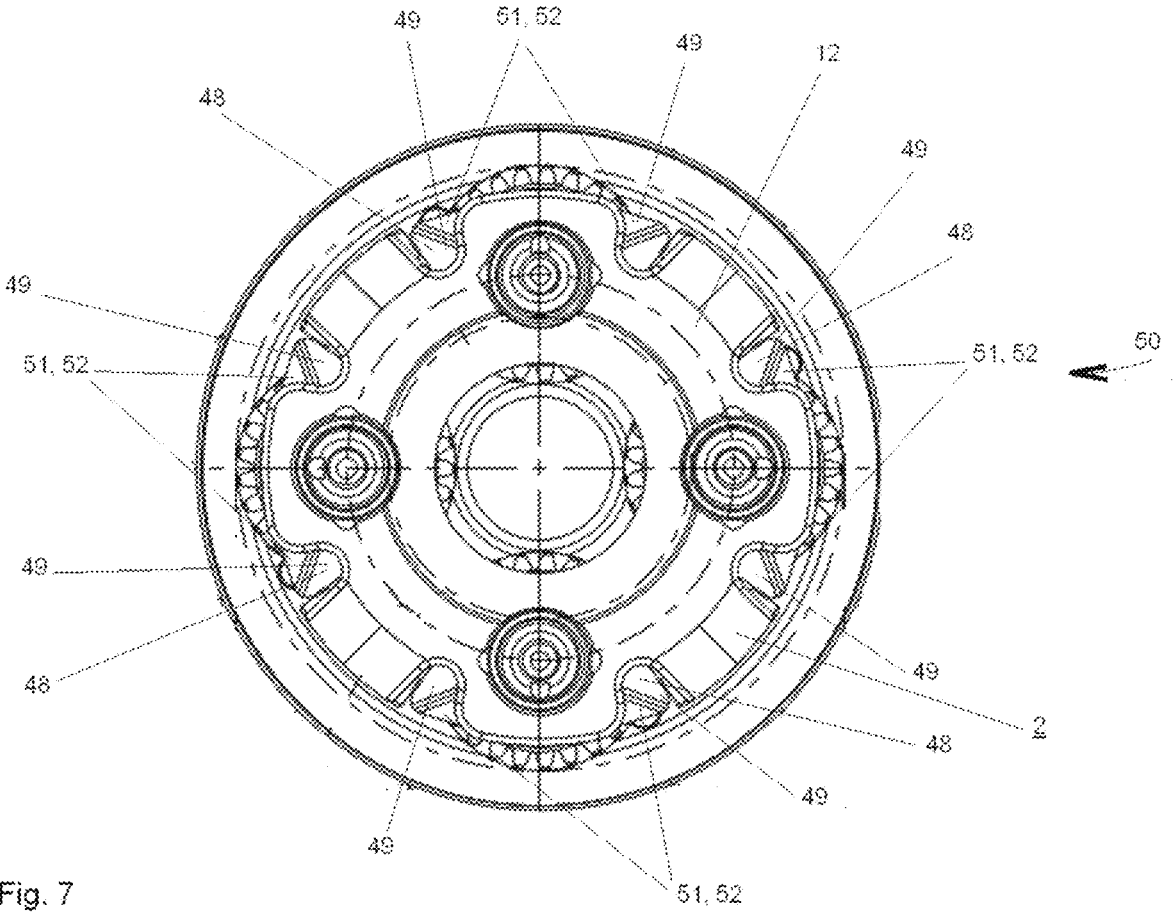
FIG. 7 shows a frontal view of a further exemplary embodiment of a planetary gearbox 50 with a view of the support cheek 12 from the front.

FIG. 7—The design of the planetary gearbox 50 is comparable to that of the planetary gearbox 1 shown in FIG. 1, with the exception of differently designed thrust washers 48, i.e., the thrust washers 6 of the planetary gearbox 1 shown in FIG. 1 can be exchanged for the thrust washers 48 and vice versa without further structural changes.

The thrust washers 48 are provided with lubrication channels 51 formed by lubrication grooves 52, each of which ends at an anti-rotation means 49 and, where the anti-rotation means 49 are no longer axially opposite the housing 2, continues in a lubrication groove 52 to the end of the anti-rotation means 49.

Figure 8:
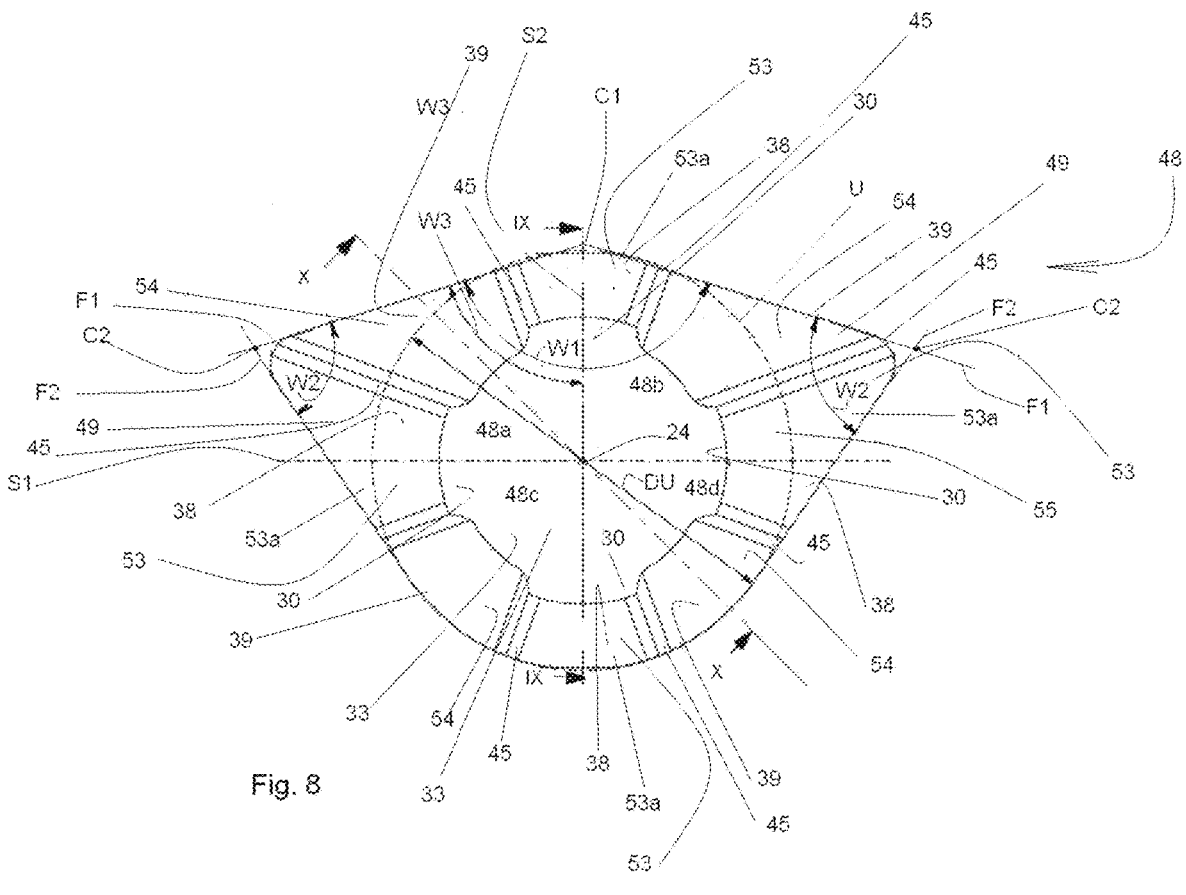
FIG. 8 shows a frontal view of an exemplary embodiment of a thrust washer 48 installed in the planetary gearbox 50 as an individual component.
Figures 9, 10:
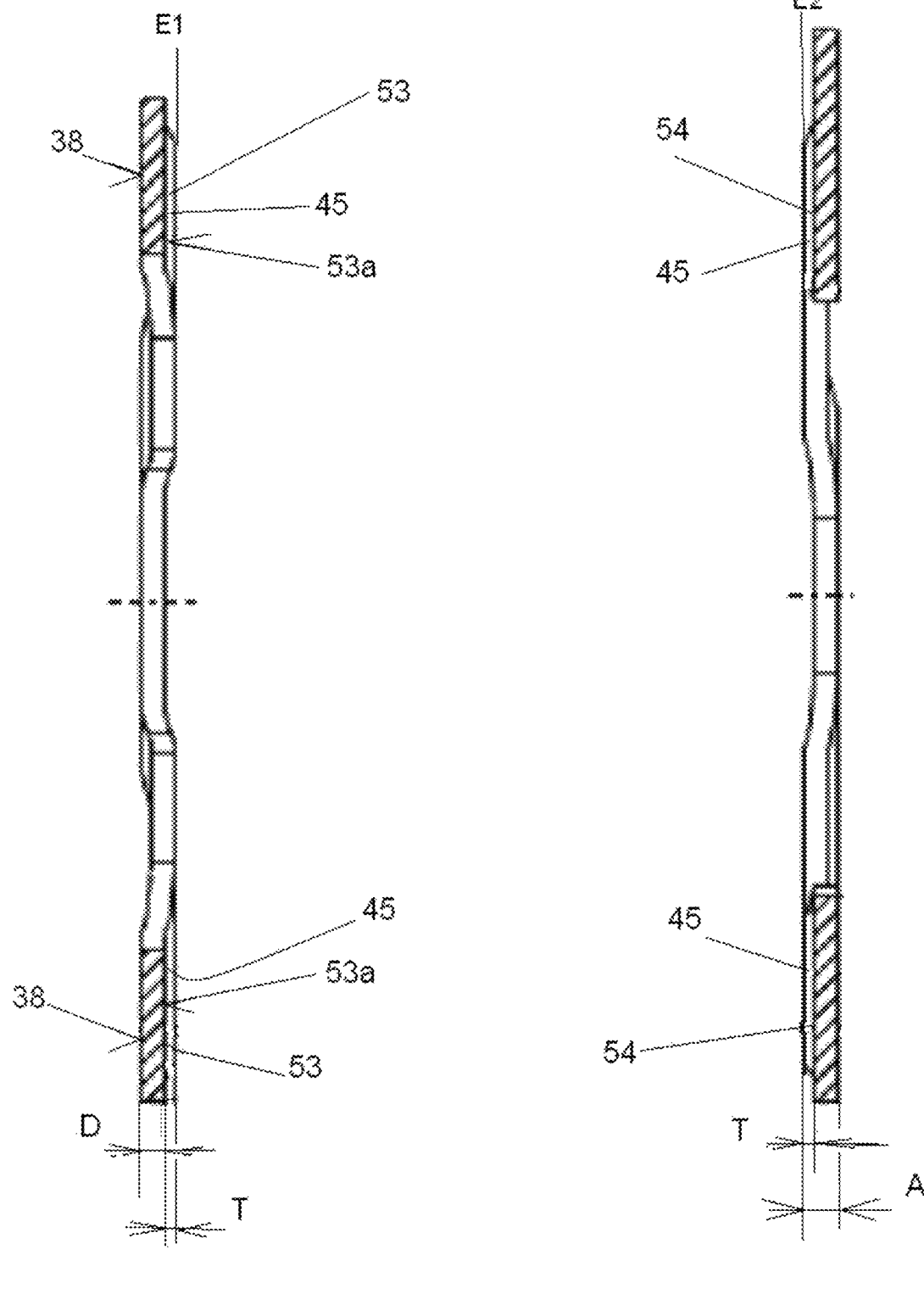
FIG. 9 shows a longitudinal section through the thrust washer 48 along the line IX-IX drawn in FIG. 8.
FIG. 10 shows a longitudinal section through the thrust washer 48 along the line X-X drawn in FIG. 1.

FIGS. 8, 9 and 10—The thrust washer has first bulges 53 and second bulges 54 circumferentially adjacent to the first bulges 53. The bulges are axial recesses created by embossing from a disc-like washer body 55 lying flat in a radial plane. In the exemplary embodiment discussed here, the first bulges 53 are curved vertically into the image plane in the representation according to FIG. 8 and are curved out axially to the left from the radial plane E1 according to the representation of FIG. 9. In the representation shown in FIG. 8, the second bulges 54 rise vertically into the image plane towards the viewer and are correspondingly curved out axially to the right from the radial plane E2 according to the representation of FIG. 10. First thrust surfaces 38 are formed on the front side of the first bulges 53, each of which is concealed behind the rear side 53a of the bulge 53 in the representation according to FIG. 8. The thrust surfaces 39 are formed on the front side of the second bulges 54. As a result, the thrust surfaces 39 are, in each case, separated from one another by a bulge 53 and the thrust surfaces 38 are separated by a bulge 54. A first bulge 53 and a second bulge 54 are, in each case, connected to one another by an elbowed section 45.

FIG. 8—The thrust washer 48 has two anti-rotation means 49 extending radially from a washer body 55 and formed circumferentially around the center axis or axis of symmetry 24 of a planet gear adjacent to one another on the washer body 55, which are formed integrally/in one piece with the washer body 55.

The contour of the anti-rotation means 49 projects radially beyond an outer circumferential line U of the washer body 55 of the thrust washer 48. In this case, the washer body 55 is annularly delimited on the inside by the contours of the through-hole with the indentations 30 and on the outside by the outer circumferential line U and has an outer diameter DU of the outer circumferential line U. In addition, the washer body 55 is designed to be symmetrical with respect to the axes of symmetry S1 and S2. The axis of symmetry S1 is aligned horizontally and the axis of symmetry S2 is aligned vertically. The axes of symmetry S1 and S2 lie in a radial plane which is pierced perpendicularly by the planetary axis 24. The axes of symmetry S1 and S2 extend perpendicular to one another and intersect at a common point on the planetary axis 24.

The contour of the anti-rotation means 49 is defined, in each case, by two flank lines F1 and F2. Each contour of one of the anti-rotation means 49 is therefore outlined in the image plane by a flank line F1 and a flank line F2 as well as an arc. The arc connects the flank lines F1 and F2 of an anti-rotation means 49. The anti-rotation means 49 are designed to be symmetrical to one another and are mirrored on the axis of symmetry S2. In this regard, the extensions of the flank lines F1 of the two anti-rotation means 49 intersect at a common intersection point C1, which lies on the extension of the axis of symmetry S2 and which lies, at a radial distance from the outer contour of the thrust washer 48, outside of the outer contour. In this regard, the flank lines F1 and F1 of the adjacent anti-rotation means 49 form an obtuse angle W1 between them and the flank lines F1 and F2 form an acute angle W2 between them and the axis of symmetry S2 on one of the anti-rotation means 49 in each case. The two flank lines F1 of both anti-rotation means 49 optionally merge at a straight line describing the outer contour of the thrust washer at this point and extending radially below the intersection point C1 or alternatively at an arcuate line (not shown) of the outer contour of the thrust washer 48.

The respective extension of the flank line F1 of the one anti-rotation means 49 intersects the extension of its flank line F2 at an intersection point C2, which lies on the axis of symmetry S1 and radially outside of the outer contour of the thrust washer 48. The contour lines F1 and F2 of the respective anti-rotation means 49 form an acute angle W2 between them.

The thrust washer 48 is geometrically divided into quarter sections 48a-48d. The quarter sections 48a-48d adjoin one another at the axes of symmetry S1 and S2 and are designed to be symmetrical to one another on the washer body 55 described by the circumferential line U. Outside of the circumferential line U, the outer contours of the quarter sections 48a and 48b lying above the axis of symmetry S1 are each delimited radially outwards by a complete flank line F1 and a part of a flank line F2. Below the axis of symmetry S1, the outer contours of the quarter sections 48c and 48d are each delimited by a part of a flank line F2 and a part of an arc line. The arc line lies on the circumferential line U. The respective flank line F2 merges into the arc line in the respective quarter section 48c and 48d, so that the contours of the anti-rotation means also extend, in each case, into the quarter section 48c or 48d lying below the axis of symmetry S1. The radius of the arc line starting from the planetary axis 24 corresponds to half the diameter DU of the outer circumferential line.

In each of the quarter sections 48a-48d, one of the bulges 54 is fully formed once. Each of the quarter sections 48a-48d also has, twice in each case, a part of one of the bulges 53. In this regard, the bulges 54 of the quarter sections 48a and 48b continue in the anti-rotation means 49 up to the outer contour of the thrust washer 48 and thus the anti-rotation means 49 at that point. In addition, a bulge 53, which extends along the axis of symmetry S1 and is formed partially in a quarter section 48a and 48d or 48b and 48d, continues radially outwards as far as the outer contour of the respective anti-rotation means 49 and thus the outer contour of the thrust washer 48. This means that in the planetary gearbox shown in FIG. 7, at least one lubrication channel (43) delimited on at least one side by the thrust washer (48) extends radially outwards to partial sections of the contour lines F1, F2 of the outer contours of the anti-rotation means

49 delimiting the anti-rotation means 49 radially on the outside—i.e., that the lubrication channel 43 or the bulges 53, 54 continue radially to the end/to the tip of the anti-rotation means 49 via the contact with the planet gear and/or the planet carrier.

FIGS. 9 and 10—The sheet metal of the thrust washer 48 has a sheet thickness D. The total thickness A of the thrust washer 48 is composed of the sheet thickness D and the axial offset T. The axial offset T is a measure of the depth of the bulges 53 and 54 and is less than the sheet thickness D in this case.

REFERENCE NUMERALS

1 Planetary gearbox
2 Housing
3 Planet gear
4 Planet bearing
4*a* Planet bearing
5 Planet pin
6 Thrust washer
6*a* Thrust washer
7 Planet carrier
8 Anti-rotation means
8*a* Anti-rotation means
9 Central axis
10 Stop
10*a* Stop
11 Gap between the planet gears
12 Support cheek of the planet carrier
13 Connecting piece of the planet carrier
14 Support cheek of the planet carrier
15 Not assigned
16 First side of the thrust washer
17 Second side of the thrust washer
18 Contour of the planet gear or toothing of the planet gear
19 First stop side
20 Second stop side
21 Planetary gearbox
22 Wing of the anti-rotation means
23 Stop
24 Planetary axis
25 Flange of the support cheek
26 Through-hole of the flange
27 Window
28 Washer body of the thrust washer
29 Toothing of the planet gear
30 Indentations on the thrust washer
31 Recesses in the thrust washer
32 Through-hole in the thrust washer
33 Base body of the support cheek
34 Edge section
35 Lubrication groove
36 Not assigned
37 Not assigned48
38 Second thrust surface of the thrust washer
39 First thrust surface of the thrust washer
40 First side of the thrust washer
41 First bulge of the thrust washer
42 Second bulge of the thrust washer
43 Lubrication channel on the thrust washer
44 Edge of the thrust washer
45 Elbowed section of the thrust washer
46 Second side of the thrust washer
47 Not assigned
48 Thrust washer

48 Quarter section of the thrust washer
48*b* Quarter section of the thrust washer
48*c* Quarter section of the thrust washer
48*d* Quarter section of the thrust washer
49 Anti-rotation means
50 Planetary gearbox?
51 Lubrication channel
52 Lubrication groove
53 First bulge on the thrust washer
53*a* Rear side of the bulge
54 Second bulge on the thrust washer
55 Washer body of the thrust washer
A Axial offset
C1 Intersection point of the flank lines
C2 Intersection point of the flank lines
D Sheet thickness
DU Diameter of the outer circumferential line
F1 Flank line
F2 Flank line
G Straight line
S1 Axis of symmetry
S2 Axis of symmetry
T Depth of the bulge
U Outer circumferential line of the washer body
W1 Angle between the flank lines
W2 Angle between the flank lines
B1 Bend The Applicant submits that no new matter was added with the above amendments, which were added for clarity purposes and to identify a geometric feature that was present within the originally submitted FIG. 5.

The invention claimed is:

1. A planetary gearbox having a housing, with planet gears and with planet bearings, wherein the planet gears are mounted on the housing by means of the planet bearings so as to be rotatable about an axially aligned planetary axis and wherein at least one of the planet bearings is formed from at least one axially aligned planet pin and a thrust washer, wherein the thrust washer is seated axially between the planet gear and the housing on the planet pin and is secured so as to prevent rotation about the planetary axis with the aid of two anti-rotation means formed on the thrust washer, and wherein each of the anti-rotation means faces a stop of the housing, wherein the thrust washer has first thrust surfaces on a first side facing the housing and second thrust surfaces offset circumferentially relative to the first thrust surfaces on a second side facing a planet gear, wherein trough-like lubrication channels are formed on the thrust washer axially on rear sides of the first and second thrust surfaces, wherein at least one of the lubrication channels extends radially outwards relative to the planetary axis to as far as an outer contour of at least one of the two anti-rotation means, and wherein at least one of the two anti-rotation means projects radially away from the planetary axis and the planet pin beyond a contour of at least one planet gear.

2. The planetary gearbox according to claim 1, wherein each of the lubrication channels extends between two of the first thrust surfaces of the thrust washer which are circumferentially adjacent to one another.

3. The planetary gearbox according to claim 1, in which at least one housing section of the housing is formed as a planet carrier with at least two support cheeks of the planet carrier connected axially via connecting pieces, wherein the stop is a connecting piece projecting axially from one support cheek of the planet carrier in the direction of a further support cheek.

4. The planetary gearbox according to claim 3, wherein each of the connecting pieces has at least one stop for one anti-rotation means formed on one and the same thrust washer of two anti-rotation means formed on the thrust washer.

5. The planetary gearbox according to claim 1, in which at least one housing section of the housing is formed as a planet carrier with at least two support cheeks, and the support cheeks are connected axially by means of connecting pieces, wherein two flanks of the planet carrier facing away from one another are the stops for the anti-rotation means of a thrust washer, and wherein the stops are formed circumferentially between two adjacent connecting pieces and thereby circumferentially adjoining the planet pin.

6. The planetary gearbox according to claim 1, wherein the two anti-rotation means extend radially from a washer body and are formed circumferentially about a planetary axis of a planet gear adjacent to one another on the washer body and are made of a material of the thrust washer, and wherein a first anti-rotation means rests against a first stop and a second anti-rotation means formed on the same thrust washer rests against a second stop opposite the first stop or facing away from this first stop.

7. A thrust washer for a planetary gearbox, according to claim 1, wherein the two anti-rotation means extend radially from a washer body and are formed circumferentially about an axis of symmetry of the washer body adjacent to one another on the washer body and are made of a material of the thrust washer, wherein the anti-rotation means are projections projecting radially beyond an outer circumference of a washer body of the thrust washer, wherein the thrust washer has first bulges and second bulges circumferentially adjacent to the first bulges, wherein thrust surfaces for sliding contact with a planet carrier or a planet gear are formed on each of the first and second bulges.

8. A planetary gearbox comprising:
a housing formed as a planet carrier with at least two support cheeks, the support cheeks connected axially by means of connecting pieces, and two flanks of the planet carrier facing away from one another comprise a pair of stops, each stop formed circumferentially between two adjacent connecting pieces, and the two flanks are formed on and extend radially from one or more of the at least two support cheeks;
a planet bearing mounted in the housing and formed from an axially aligned planet pin and a thrust washer; and
a planet gear rotatable about a planetary axis on the planet bearing, wherein the thrust washer comprises:
an outer circumferential surface;
two integrally-formed projections, each facing a one of the pair of stops to prevent rotation of the thrust washer about the planetary axis and extending radially beyond the outer circumferential surface relative to the planetary axis;
first thrust surfaces disposed on a first side of the thrust washer facing the housing;
first lubrication channels formed axially opposite the first thrust surfaces and extending radially outwards;
second thrust surfaces circumferentially offset from the first thrust surfaces and disposed on a second side of the thrust washer facing the planet gear; and
second lubrication channels formed axially opposite the second thrust surfaces and extending radially outwards.

9. The planetary gearbox of claim 8, wherein the second lubrication channels extend between circumferentially adjacent first thrust surfaces.

10. The planetary gearbox of claim 8, wherein the projections project radially away from the planet pin beyond an outer contour of the planet gear.

11. The planetary gearbox of claim 8, wherein:
the housing comprises a housing section formed as a planet carrier;
the planet carrier comprises two axially offset support cheeks connected by connecting pieces; and
the connecting pieces form the pair of stops.

12. The planetary gearbox of claim 8, wherein:
the two integrally-formed projections are tongue-like projections; and
a one of the second lubrication channels ends at a one of the tongue-like projections.

13. The planetary gearbox of claim 8, wherein:
the two integrally-formed projections are bulges; and
one of the second lubrication channels extends to a flank line delimiting a radial outside of a one of the bulges.

14. A planetary gearbox comprising:
a housing comprising a pair of stops;
a planet bearing mounted in the housing and formed from an axially aligned planet pin and a thrust washer; and
a planet gear rotatable about a planetary axis on the planet bearing, wherein the thrust washer comprises:
two integrally-formed tongue-like projections curved so as to form a wing, each wing engaged behind a one of the pair of stops to prevent rotation of the thrust washer about the planetary axis;
a radially outer surface;
first thrust surfaces disposed on a first side of the thrust washer facing the housing and first lubrication channels formed axially opposite the first thrust surfaces and extending radially outwards to the radially outer surface; and
second thrust surfaces circumferentially offset from the first thrust surfaces and disposed on a second side of the thrust washer facing the planet gear and second lubrication channels formed axially opposite the second thrust surfaces and extending radially outwards to the radially outer surface,
wherein the housing comprises a housing section formed as a planet carrier; and
wherein the planet carrier comprises:
two axially offset support cheeks connected by connecting pieces; and
two flanks facing away from one another and formed circumferentially between two circumferentially adjacent connecting pieces, the flanks formed on and extending radially from at least one of the support cheeks; and
wherein:
the two flanks form the pair of stops; and
a distal end portion of each of the two tongue-like projections includes a bend such that the distal end portion contacts a corresponding flank of the planet carrier.

15. The planetary gearbox of claim 5, wherein the at least two support cheeks are axially offset from each other by the connecting pieces, and the two flanks are formed on and extend radially from one or more of the at least two support cheeks.

16. The planetary gearbox of claim 15, wherein a distal end portion of each anti-rotation means includes a bend such that the distal end portion contacts a corresponding flank of the planet carrier.

17. The planetary gearbox of claim 1, wherein each of the two anti-rotation means are defined by a first flank line and a second flank line that form an acute angle.

\* \* \* \* \*